United States Patent
Dimou et al.

(10) Patent No.: US 9,119,178 B2
(45) Date of Patent: Aug. 25, 2015

(54) EFFICIENT TRANSMISSION PARAMETER SELECTION

(71) Applicant: Telefonaktiebolaget L M Ericsson (publ), Stockholm (SE)

(72) Inventors: Konstantinos Dimou, Stockholm (SE); Jan-Erik Berg, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 112 days.

(21) Appl. No.: 13/834,892

(22) Filed: Mar. 15, 2013

(65) Prior Publication Data

US 2014/0226573 A1    Aug. 14, 2014

Related U.S. Application Data

(60) Provisional application No. 61/762,425, filed on Feb. 8, 2013.

(51) Int. Cl.

| | |
|---|---|
| *H04B 7/216* | (2006.01) |
| *H04W 72/02* | (2009.01) |
| *H04W 4/00* | (2009.01) |
| *H04W 52/24* | (2009.01) |
| *H04W 52/38* | (2009.01) |

(52) U.S. Cl.
CPC .............. *H04W 72/02* (2013.01); *H04W 4/005* (2013.01); *H04W 52/24* (2013.01); *H04W 52/383* (2013.01)

(58) Field of Classification Search
CPC ... H04W 72/02; H04W 52/383; H04W 52/24; H04W 4/005
USPC ........................................................ 370/252
See application file for complete search history.

(56) References Cited

U.S. PATENT DOCUMENTS

| | | | |
|---|---|---|---|
| 4,916,539 A | * | 4/1990 | Galumbeck .................. 348/467 |
| 6,115,614 A | * | 9/2000 | Furukawa ..................... 455/525 |
| 6,625,466 B1 | | 9/2003 | Dicker et al. |
| 7,047,029 B1 | | 5/2006 | Godwin et al. |

(Continued)

FOREIGN PATENT DOCUMENTS

| | | |
|---|---|---|
| EP | 1575185 A1 | 9/2005 |
| WO | 2010144918 A2 | 12/2010 |

OTHER PUBLICATIONS

International Search Report and Written Opinion issued on Apr. 17, 2014 in corresponding international application No. PCT/IB2014/058842, 9 pages.

*Primary Examiner* — Jay P Patel
(74) *Attorney, Agent, or Firm* — Rothwell, Figg, Ernst & Manbeck, P.C.

(57) ABSTRACT

Devices and methods for efficient transmission parameter selection are disclosed. A transmission parameter is for use by a wireless communication device (WCD) in a process that includes obtaining a propagation value that is indicative of a radio link between first and second WCDs and obtaining a set of one or more weather values that indicate a weather state at or near the first WCD. In some embodiments, a control unit determines: (1) whether the propagation value satisfies a predetermined propagation condition; and (2) whether the weather state satisfies a predetermined weather condition. The control unit then performs a first transmission parameter selection procedure in response to determining at least that the propagation value satisfies the predetermined propagation condition and the weather state satisfies the predetermined weather condition.

31 Claims, 7 Drawing Sheets

(56) References Cited

U.S. PATENT DOCUMENTS

| | | | |
|---|---|---|---|
| 7,573,860 B2* | 8/2009 | Zhao et al. | 370/342 |
| 7,648,102 B2* | 1/2010 | French et al. | 244/31 |
| 7,669,369 B2* | 3/2010 | Henry et al. | 49/471 |
| 8,442,572 B2* | 5/2013 | Borran et al. | 455/522 |
| 2004/0035125 A1* | 2/2004 | Ishida et al. | 62/132 |
| 2005/0006523 A1* | 1/2005 | French et al. | 244/31 |
| 2006/0046638 A1* | 3/2006 | Takeuchi et al. | 455/3.02 |
| 2006/0150521 A1* | 7/2006 | Henry et al. | 49/471 |
| 2007/0077956 A1* | 4/2007 | Julian et al. | 455/522 |
| 2007/0199503 A1* | 8/2007 | French et al. | 116/210 |
| 2008/0154495 A1* | 6/2008 | Breed | 701/208 |
| 2008/0201108 A1* | 8/2008 | Furem et al. | 702/182 |
| 2009/0030605 A1* | 1/2009 | Breed | 701/208 |
| 2009/0109937 A1* | 4/2009 | Cave et al. | 370/336 |
| 2009/0140887 A1* | 6/2009 | Breed et al. | 340/990 |
| 2010/0029321 A1* | 2/2010 | Miyamoto | 455/522 |
| 2011/0026420 A1* | 2/2011 | Zhang et al. | 370/252 |
| 2011/0231169 A1* | 9/2011 | Furem et al. | 703/2 |
| 2011/0294429 A1* | 12/2011 | Shirakata et al. | 455/41.2 |
| 2012/0127921 A1* | 5/2012 | Laufer | 370/316 |
| 2012/0309336 A1* | 12/2012 | Tanaka et al. | 455/226.2 |
| 2013/0157651 A1* | 6/2013 | Khaitan et al. | 455/422.1 |
| 2013/0157680 A1* | 6/2013 | Morita et al. | 455/452.2 |
| 2013/0172049 A1* | 7/2013 | Duong et al. | 455/559 |
| 2013/0282238 A1* | 10/2013 | Ricci et al. | 701/41 |

* cited by examiner

EFFICIENT TRANSMISSION PARAMETER SELECTION

This application claims the benefit of provisional patent application No. 61/762,425, filed on Feb. 8, 2013, and which is incorporated by reference herein in its entirety.

TECHNICAL FIELD

This disclosure relates generally to improving transmission quality and/or energy efficiency in wireless networks and, more particularly, to methods and devices for selecting transmission parameters and configuring wireless devices.

BACKGROUND

Machine-to-machine (M2M) communication is becoming an increasingly critical consideration in the development of future communication technologies. In M2M communications, machine type communication (MTC) devices such as smart meters, signboards, cameras, remote sensors, laptops, and appliances utilize a communication network to transmit data to a receiving host (e.g., a data collection server). MTC devices may differ dramatically from conventional communication devices. For instance, many MTC devices are designed to transmit sporadic bursts of one or a few short packets containing measurements, reports, and triggers, such as temperature, humidity, or wind speed readings. In some cases, MTC devices are expected to be installed in a fixed location or have low mobility. MTC devices are typically low complexity devices, targeting low-end (low average revenue per user, low data rate, high latency tolerances, etc.) applications. These devices often have severe limitations on power/energy consumption.

Uplink (UL) power control is an important radio resource management (RRM) function and is primarily used to set the transmission power level of a transmitting device (e.g., MTC device) in such a way that performance and transmission quality requirements are met. For example, UL power control is used to ensure that the required signal-to-noise-plus-interference (SINR) at a base station, or other network access node, is achieved and consequently, the corresponding transmitted information is correctly decoded. Another aim of UL power control is minimizing interference and transmit power. Minimizing transmit power, which has the benefit of reducing energy consumption, can be extremely important with respect M2M communications.

SUMMARY

In view of the above features and goals, as well as other features of MTC devices, the M2M services defined by the Third Generation Partnership Project (3GPP) Long Term Evolution (LTE) standards, and other communications standards, often place very different requirements and demands on a wireless network from those of traditional services, such as voice and web streaming, for example. These differences are compounded by the fact that wireless networks supporting M2M communications may be required to serve a significantly larger number of devices than is typical in conventional wireless networks, as MTC devices are expected to be cheap and widely deployed. As a result, designing for M2M communications in a wireless communication networks creates several challenges.

Although some existing implementations are directed to reducing energy consumption of wireless sensors, and networks may utilize information regarding the lack of movement of certain devices, there remains a need for methods and devices that can effectively use radio channel characteristics to optimize energy consumption within "static" wireless communication devices (WCDs) (e.g., WCDs that have low mobility or are stationary). Further, many static WCDs (particularly static MTC devices) may be exposed to harsh conditions, such as extreme weather conditions, which can affect radio propagation channels. As such, there is an additional need for improved power techniques that can mitigate these channel variations.

According to some embodiments, an uplink power control mechanism is provided. The control mechanism may be implemented, for instance, in connection with static WCDs, where the state of being stationary is known to the network, or for wireless backhaul links between static network components such as base station-relay nodes. The mechanism considers factors such as the multipath profile of the radio propagation profile, for example, the Ricean K factor, as well as weather conditions that may affect the radio propagation.

According to some embodiments, a method for selecting a transmission parameter for use by a WCD includes obtaining, at a control unit, a propagation value that is indicative of a radio link between first and second WCDs. The control unit also obtains a set of one or more weather values that indicate a weather state at or near the first WCD. The control unit determines: (1) whether the propagation value satisfies a predetermined propagation condition; and (2) whether the weather state satisfies a predetermined weather condition. The method further includes the control unit performing a first transmission parameter selection procedure in response to determining at least that the propagation value satisfies the predetermined propagation condition and the weather state satisfies the predetermined weather condition. The control unit is also configured to perform a second transmission parameter selection procedure, which is different than the first transmission parameter selection procedure, when the propagation value does not satisfy the predetermined propagation condition or the weather state does not satisfy the predetermined weather condition.

According to some embodiments, the method further comprises determining whether the first WCD is a static WCD. In certain aspects, the control unit may be a component of the first WCD, the second WCD, or a Radio Network controller.

According to some embodiments, a method for selecting a transmission parameter for a Machine Type Communication (MTC) device in a wireless network, which has one or more access nodes, includes transmitting, from the MTC device, a weather status signal that indicates a weather status of the MTC device. The method further includes receiving, at the MTC device, a reduced size control signal from one of the access nodes. In certain aspects, the reduced size control signal is based at least in part on the weather status signal. The method also includes selecting, at the MTC device, a transmission parameter for communication from the MTC device based on the reduced size control signal.

According to some embodiments, the transmission parameter may be one of a channel allocation parameter, a power allocation parameter, a link adaptation parameter, a multiple input multiple output (MIMO) configuration parameter, or a redundancy setting parameter.

According to some embodiments, an access node is provided that includes data storage, a transceiver, and a processor connected to one or more of the data storage and transceiver. The processor may be configured to select a transmission parameter for use by a wireless communication device by obtaining a propagation value that is indicative of a radio link between the access node and the WCD. The processor may also obtain a set of one or more weather values that indicate a weather state at or near the WCD. The processor then determines: (1) whether the propagation value satisfies a predetermined propagation condition; and (2) whether the weather state satisfies a predetermined weather condition. The processor is further configured to perform a first transmission parameter selection procedure in response to determining at least that the propagation value satisfies the predetermined propagation condition and the weather state satisfies the predetermined weather condition. The processor is also configured to perform a second transmission parameter selection procedure, which is different than the first transmission parameter selection procedure, when the propagation value does not satisfy the predetermined propagation condition or the weather state does not satisfy the predetermined weather condition.

According to some embodiments, a control node is provided that includes data storage, a network interface, and a processor connected to one or more of the data storage and network interface. The processor may be configured to select a transmission parameter for use by a wireless communication device by obtaining a propagation value that is indicative of a radio link between a first and second WCD. The processor may also obtain a set of one or more weather values that indicate a weather state at or near the first WCD. The processor then determines: (1) whether the propagation value satisfies a predetermined propagation condition; and (2) whether the weather state satisfies a predetermined weather condition. The processor is further configured to perform a first transmission parameter selection procedure in response to determining at least that the propagation value satisfies the predetermined propagation condition and the weather state satisfies the predetermined weather condition. The processor is also configured to perform a second transmission parameter selection procedure, which is different than the first transmission parameter selection procedure, when the propagation value does not satisfy the predetermined propagation condition or the weather state does not satisfy the predetermined weather condition.

According to some embodiments, a wireless communication device (WCD) is provided that includes data storage, a transceiver, and a processor connected to one or more of the data storage and transceiver. The processor may be configured to select a transmission parameter by obtaining a propagation value that is indicative of a radio link between it and an access node. The processor may also obtain a set of one or more weather values that indicate a weather state at or near the wireless device. For instance, the WCD may directly measure one or more weather conditions. The processor then determines: (1) whether the propagation value satisfies a predetermined propagation condition; and (2) whether the weather state satisfies a predetermined weather condition. The processor is further configured to perform a first transmission parameter selection procedure in response to determining at least that the propagation value satisfies the predetermined propagation condition and the weather state satisfies the predetermined weather condition. The processor is also configured to perform a second transmission parameter selection procedure, which is different than the first transmission parameter selection procedure, when the propagation value does not satisfy the predetermined propagation condition or the weather state does not satisfy the predetermined weather condition.

According to some embodiments, the processor of the wireless device may be configured to select a transmission parameter. The processor may be configured to transmit, from the device, a weather status signal that indicates a weather status of the device. The processor may further configured to receive a reduced size control signal from an access node of its network. In certain aspects, the reduced size control signal is based at least in part on the weather status signal. The processor is also configured to select a transmission parameter for communication from the device, which is based on the reduced size control signal.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
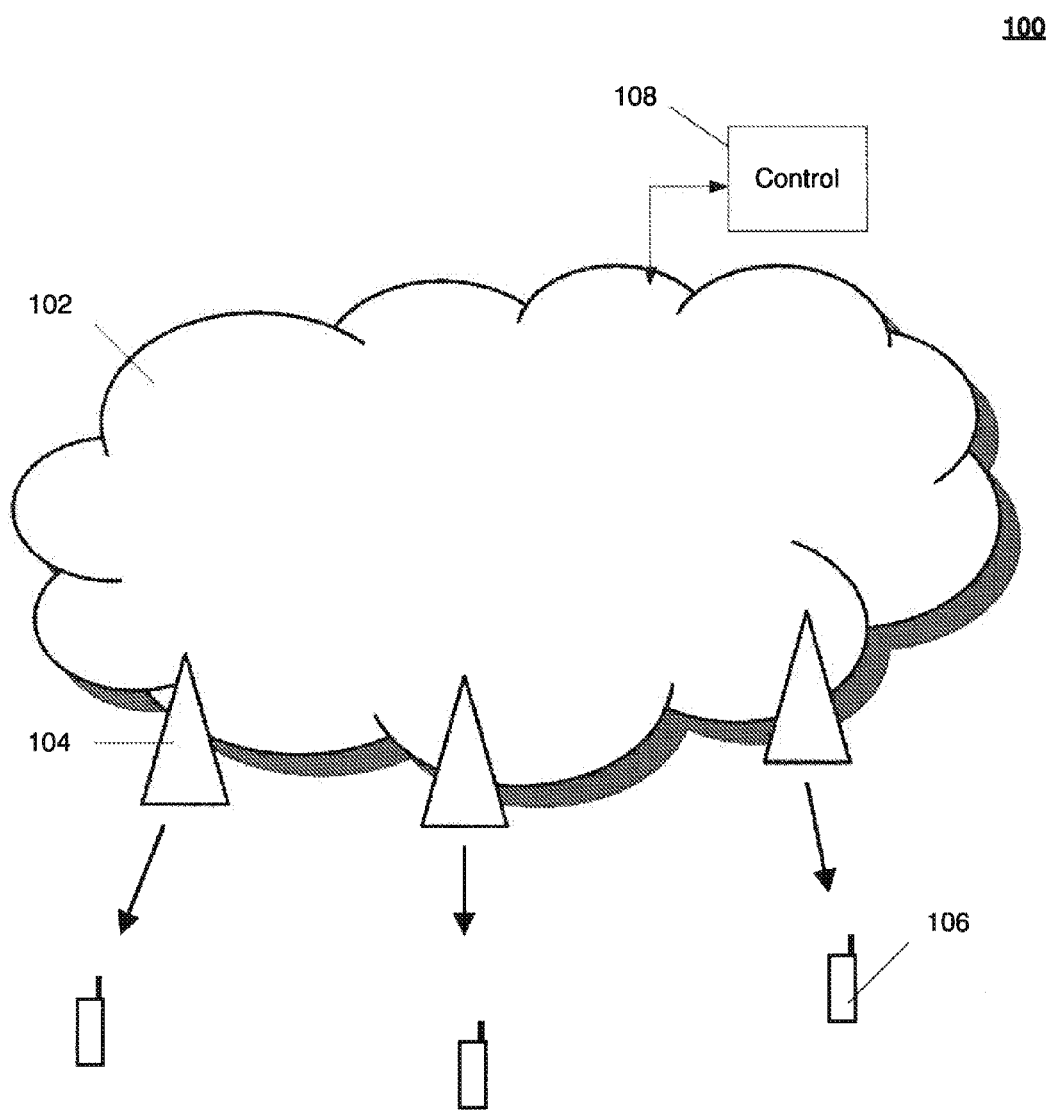
FIG. 1 is an illustration of a wireless communication network in accordance with exemplary embodiments.

Particular embodiments are directed to methods and devices for energy efficient selection of transmission parameters based at least in part on consideration of a propagation value and weather conditions.

According to certain implementations, a network can use information on weather conditions, such as wind and rain, along with previous radio resource management actions, such as scheduling, power control, or link adaptation, for current power control and radio resource management decisions when a transmission parameter, such as a Ricean K factor, is measured and exceeds a predetermined threshold. These implementations my be applied in a scenario where a wireless communication device (WCD) is known, at the network and possibly at device, to be static and communicating with other static devices, such as terminals, network nodes, wireless sensors, and other devices.

According to some embodiments, transmission parameter selection techniques may be performed by a control unit that is responsible for managing certain aspects of transmissions made by a WCD, which may include power allocation, scheduling (e.g., of frequency and/or time resources), link adaptation (e.g., coding and modulation selection), redundancy configurations, multi-antenna (e.g., MIMO) settings, and/or any other controllable aspect these transmissions. Depending on the specific implementation, the control unit may be embodied as or a component of a network access node, such as an eNode B or other type of base station, a relay node, a control node, such as Radio Network Controller (RNC), or a wireless communication device, such as user equipment (UE) and other terminals, wireless sensors, MTC devices, and other devices. Additionally, techniques disclosed herein may be implemented using multiple separate devices. For instance, a wireless communication device and its serving base stations may cooperate to perform certain disclosed functionality.

In particular implementations of the proposed solutions, a method of configuring a wireless communication device for transmission includes obtaining, at a control unit, Ricean factor information indicating a value of a Ricean K factor for a wireless link to be used by the WCD. The method also includes deciding based on: (i) the Ricean factor information; and (ii) weather information, whether or not to use a predetermined set of one or more transmission parameters to configure the wireless communication device for a transmission over the wireless link.

In particular implementations, the method further includes transmitting control information to the wireless communication device indicating a selected set of transmission parameters. In particular implementations, transmitting control information to the wireless communication device comprises transmitting a first amount of control information to the wireless communication device when the control unit decides not to use the predetermined set of transmission parameters, and transmitting a second amount of control information to the WCD when the control unit decides to use the predetermined set of transmission parameters. The second amount of control information is less than the first amount of control information. In particular implementations, the second amount of control information includes a single bit that instructs the wireless communication device to use the predetermined set of transmission parameters.

In some embodiments, the method may include transmitting control information that indicates a selected set of transmission parameters to the wireless communication device when the control unit decides not to use the predetermined set of transmission parameters, and refraining from transmitting control information indicating the selected set of transmission parameters when the control unit decides to use the predetermined set of transmission parameters. In such implementations, the control unit may still transmit control information indicating certain transmission parameters that may be set in other manners even when the control unit refrains from transmitting control information indicating the transmission parameters selected in the manner described above.

The proposed solutions also provide a control unit for configuring a wireless communication device. In particular implementations, the control unit includes a transmitter, a sensor interface, and a processor. The processor may be configured to implement, for example, any of the methods described herein.

In certain aspects, the disclosed solutions also provide a wireless communication device that includes a transmitter and a processor. The processor may be configured to implement, for example, any of the methods described herein.

Referring to FIG. 1, a wireless communication deployment 100 in accordance with exemplary embodiments includes an access node 104 serving WCD 106, which may be a static WCD, such as a static MTC device. Node 104 may be, for example, a base station, relay node, or gateway type device, and is capable of communicating with device 106, along with any additional elements suitable to support wireless communication between wireless communication devices or between a wireless communication device and another communication device, such as landline telephone. The access node 104 may be in communication with, for instance via a network 102, one or more control nodes 108, such as a Radio Network Controller (RNC), or a Mobile Switching Center (MSC) or Base Station Subsystem (BSS). Although node 108 is explicitly identified as a control node, each of nodes 104, 106, and 108 may be understood as a "control" node to the extent that it includes a control unit or otherwise implements control functions.

Figure 2:
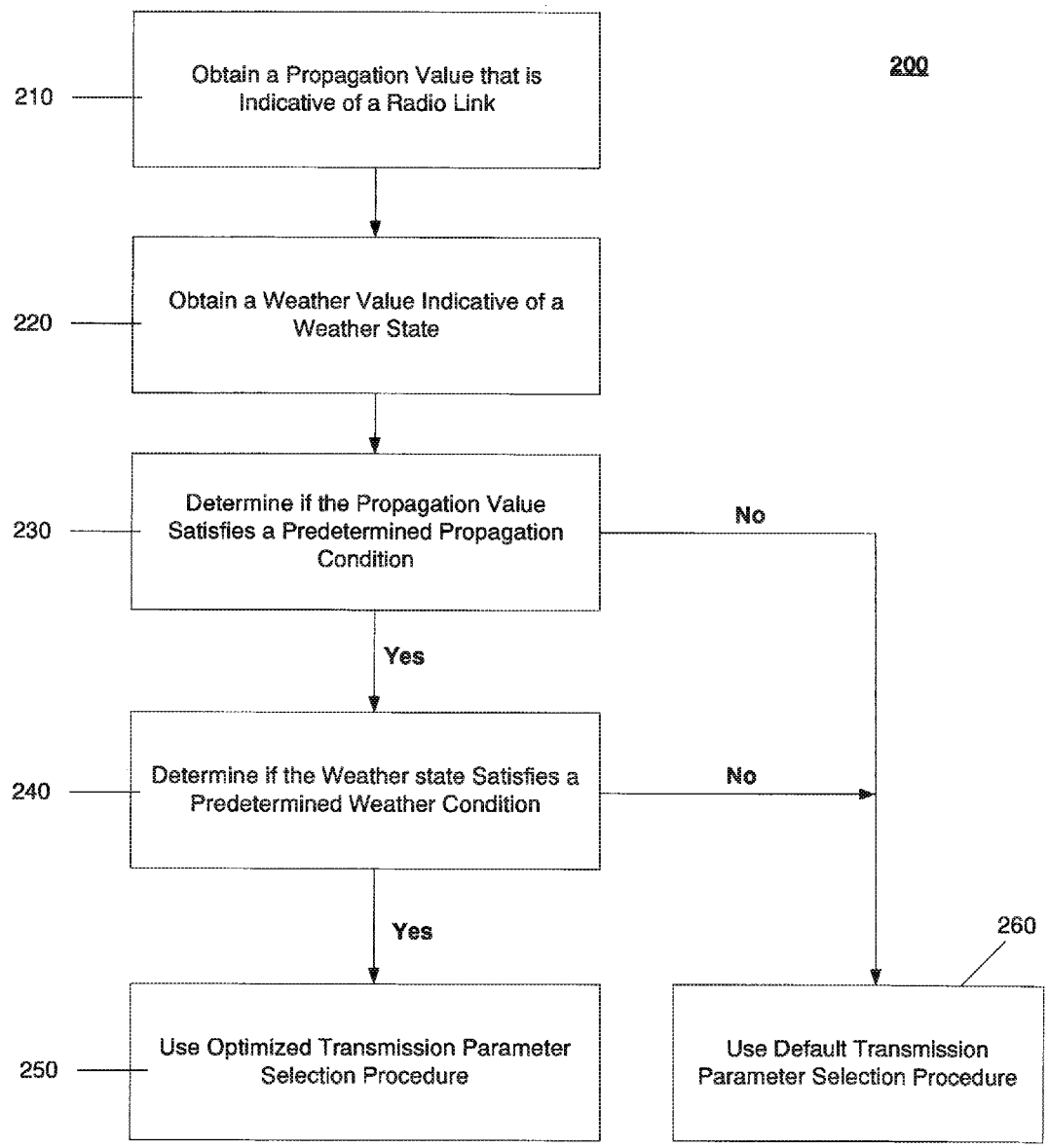
FIG. 2 is a flow chart illustrating a transmission parameter selection process in accordance with exemplary embodiments.

Referring now to FIG. 2, a process 200 for selecting a transmission parameter for use by a WCD is provided. The process 200 may be performed, for instance, by access node 104, WCD 106, and/or control node 108 to select transmission parameters for communications between WCD 106 and access node 104. For example, WCD 106 may be a static MTC device being served by access node 104, which may be a serving base station of network 102 or a relay node.

In some embodiments, prior to performance of process 200, a determination may be made as to whether device 106 is a static device. For instance, a control unit of access node 104 or control node 108 may determine directly whether the wireless link to device 106 is static. Mobility information describing mobility capabilities of device 106 may also be stored within the network, for instance, at an operation and maintenance (O&M) node, and this information may be provided to the control unit.

If the control unit is responsible for determining the mobility capabilities of the device 106, various techniques may be employed to detect the mobility capabilities. Such information may be known beforehand to the device 106, or detected by device 106 during operation, and then communicated to the control unit. The control unit may also determine the device's mobility capabilities based on device type for device 106, location information collected for device 106, connection information for device 106, such as which base stations the device has connected to over time, handover information for the device, such as whether the device has been involved in a handover or how frequently the device has been involved in a handover, and/or any other appropriate information that may be indicative of the device's mobility capability.

If it is determined that the wireless link is between static devices and nodes, then the control unit may consider various characteristics of the radio channel and/or environment in which the devices are communication when determining whether to use improved power allocation/scheduling techniques, for instance, as outlined in process 200.

If it is determined that the wireless link is not between static devices, the control unit may determine that transmissions between devices, such as between access node 104 and device 106, should be configured according to current conditions using default techniques. For example, selection of appropriate transmission parameters according to current conditions may include the control unit performing scheduling decisions and power allocations based on channel state information (CSI) exchanged between transmitter and receiver. In particular implementations, this may result in power allocation/scheduling decisions being performed using default techniques used to perform power allocation/scheduling decisions for other types of communication devices served by the network, such as those typically used for conventional UEs. In some embodiments, this may include the transmission of a particular amount of control information indicating the power allocation/scheduling decision to the UE. Additionally, this may involve transmission of information, such as sounding reference signals, from a UE, such as device 106, to the network to allow the control unit to determine the current state of the wireless link between device 106 and an access node 104.

In step 210, a propagation value that is indicative of a radio link between two WCDs is obtained. The radio link may be, for example, between device 106 and the network, via access node 104. The value may be obtained, for example, by a control unit of access node 104, control node 108, or WCD 106. In some embodiments, the propagation value may be a Ricean K factor. The propagation value may be measured by the control unit, or a device directly connected to the control unit, such as access node 104 when the control unit is a component of the access node 104. The propagation value may also be determined by another device and then communicated to the control unit.

Energy efficient parameter selection, including the process 200, may be used with respect to any channel that is static, and for non-static channels, in situations in which the channel in not varying significantly. The Ricean K can be helpful in determining whether disclosed techniques may be used because probability of small channel variation is higher when the Ricean K factor is high. A high K factor means that the strongest channel path, also referred to as a "component," is significantly higher than other components. In practice, this may mean that when the K factor is high, there is a Line of Sight (LOS) component or very strong diffracted or reflected path. As such, fast fading is not as severe as in other channel profiles with several paths having equal power profiles. In the case of a high K factor, variation of the channel due to third users is lower than in other cases, since the third user generating changes in the multi-path profile of the radio link should affect the single radio path. Statistically, this happens less often when compared to the case in which several paths are affecting the link.

In step 220, a weather value indicative of a weather state is obtained. The weather value may be indicative of, for example, a weather state at or near WCD 106 in deployment 100. According to some embodiments, the weather state may include current, recent, and/or historical weather conditions associated with the wireless link between the two WCDs, such as weather conditions at or near WCD 106, access node 104, or the space in between the nodes. The weather value obtained in step 220 may be related to rainfall intensity, rain level, and/or wind speed. The weather value may be measured by the control unit or a device directly connected to the control unit, such as access node 104 when the control unit is a component of the access node 104. For instance, the control unit may be part of a network node, base station, gateway, relay node, light base station, anchor UE, or other device that is equipped with rain and wind measurement sensors. The weather value may also be determined by another device and then communicated to the control unit. In some embodiments, device 106 may be a sensor configured to measure one or more weather conditions, and may determine the weather value directly.

In step 230, it is determined whether the propagation value satisfies a predetermined propagation condition. For example, it may be determined by the control unit whether the propagation value exceeds or is below a threshold level. In some embodiments, it is determined whether a Ricean K value obtained in step 210 is greater than a threshold Ricean K level. If the propagation condition is satisfied, the process 200 moves to step 240. Otherwise, the process 200 moves to step 260, where default transmission parameter selection procedures may be used.

In step 240, it is determined whether the weather value satisfies a predetermined weather condition. For example, it may be determined by the control unit whether the weather value exceeds or is below a threshold level. In some embodiments this may include evaluating whether rainfall intensity is below a threshold rainfall intensity, whether a rain level is below a rain level threshold, and/or whether a wind speed is less than a wind speed threshold. If the weather condition is satisfied, the process 200 moves to step 250. Otherwise, the process 200 moves to step 260, where default transmission parameter selection procedures may be used.

In step 250, an optimized transmission selection procedure is initiated. The selection may be performed by, for example, a control unit of access node 104, control node 108, or WCD 106. For instance, when it is determined that the relevant factors, such as propagation and weather conditions, indicate that the channel between the wireless device and network is sufficiently static and limited changes with respect to previous instances should be expected, the optimized selection procedure may be used.

According to some embodiments, step 260 may include investigating the availability of information on previous transmissions settings, and if such information is available, the control unit may use a transmission parameter or parameters (e.g., scheduling and/or power allocation) that have been previously determined. The previously determined parameters may include, for example, transmission parameters for the most recent transmission of the WCD 106, transmission parameters most frequently assigned to the WCD 106, transmission parameters optimized for the WCD 106, default transmission parameters, and/or any suitable transmission parameters that have been made known to the WCD 106 at some earlier point in time. For instance, parameters may be set in accordance with an applicable communications standard and stored in memory of the WCD 106 or sent to the device 106 upon its connection to the cell. If previously determined parameters are not available, default techniques may be applied.

In some embodiments, when the control unit re-uses previous transmission parameters, it may be able to refrain from transmitting certain control information indicating the relevant power allocation and/or the relevant scheduling decision to the relevant transmitter. For instance, limited information may need to be communicated between access node 104 and WCD 106 when setting transmission parameters. This may provide a reduction in the amount of overhead signaling that would otherwise occur if power allocation and/or scheduling were performed in accordance with default techniques.

For example, when using default techniques, the control unit may be required to send Transmit Power Commands (TPC) to the WCD providing information on the transmit power the WCD should use when transmitting over the relevant wireless link. In contrast, when using an improved power allocation technique in accordance with the present disclosure, the control unit may be able to refrain from form transmitting TPC to the WCD. Similarly, when using a default technique for scheduling, the control unit may need to send a resource block allocation, for instance, in a Downlink Control Information (DCI) message, that specifies a time-frequency resource block the WCD should use for a corresponding transmission. When the control unit can refrain from sending some or all of the information that it normally would under default techniques, the WCD 106 may use either the exact same setting for the relevant parameter, as used in a prior transmission, or modified in some manner.

In some embodiments, when transmission parameters are set according to the improved techniques described herein, a wireless communication device, such as device 106, may be able to reduce or eliminate certain control signaling that is typically provided to an access or control node during default protocols.

For instance, it may not be necessary for device 106 to transmit channel state information (CSI) to a serving base station, such as access node 104 or other node. Even though the relevant CSI may relate to the wireless device's downlink (DL) channel rather than the uplink channel relevant to the transmission parameters described above, it may still be possible to reduce or eliminate CSI or other information transmitted by the relevant wireless communication device. As an example, it may be possible in the case of communications between a relay node and a stationary wireless sensor operating in LTE Advanced with a new DL transmission from the relay node to the wireless sensor taking place at time $t_0$. In this case, transmission takes place within one physical resource block (PRB), e.g., PRB#10, which is known from the previous CSI reports to be the one with the lowest path loss (i.e., best performance) for this specific link. The transmission may convey the request from the network to the sensor to report one or more measurements. If the transmission takes place within one single TTI, then sending CSI information from the sensor to the relay node for uplink transmission is not directly useful, since CSI is used for link adaptation purposes in case of consecutive in time DL transmission. In the case of consecutive in time DL transmissions, wireless devices in accordance with disclosed embodiments do not necessarily need to send CSI information. Hence, signaling related to DL transmissions is also reduced.

In some embodiments, when the control unit decides to rely on previous knowledge of the radio channel and/or utilize previous transmission parameters, an access node, such as node 104, may transmit an extremely reduced transmission parameter signal, such as a signal comprising only a single bit. For example, the control unit may set a flag associated with one or more transmission parameters to "1" when the previous setting for the relevant parameters are to be used. In some instances, transmissions are performed on the same radio resources as the optimized allocation; however, the power setting may be set to the optimized power allocation with an extra delta value, "D." The delta D may be communicated to the wireless device or determined by the device itself. In some embodiments, when it is decided that previous knowledge of the channel should be used, no information is signaled to the receiving (i.e., "slave") communicating entity, which then makes transmissions by using exactly the same radio and power resources used previously.

In some embodiments, the optimized transmission parameters, such as scheduling and power allocation, may represent an allocation previously determined to be the best based on prior channel conditions that are similar to the current channel conditions. Optimized parameters may be stored, for example, in memory of access node 104, control node 108, and/or WCD 106. The best parameters may be identified by one or more metrics such as signal-to-noise-plus-interference (SINR), error-free transmission rates, and/or reference signaling receive values.

Certain aspects of the optimized parameters may be understood with respect to the following example, regarding a stationary wireless sensor located in a rural area with few obstacles around it and communicating with a relay node. In this example, the wireless sensor reports humidity level of the field every hour and the UL transmission/report requires 1 PRB. Previous measurements/decisions on the same link have shown that the best PRB in terms of frequency-channel response is PRB#10. Previous power allocations have for this link on the same PRB have shown that for these same channel conditions a transmission power level of 8 dBm is the one that results in error free transmission of the same UL message. Previous measurements of the same link have shown that transmitting at lower than an 8 dBm level results in erroneous reception at the relay node. As such, a determination may be made to use the optimum parameters—PRB#10 at 8 dBm. This may be communicated to the wireless device, decided by the wireless device, or decided by the wireless device based on reduced signaling from the relay node.

In some embodiments, a master communicating entity is aware of the traffic pattern and time instants of transmission of the slave communicating entity and listens to the transmissions from the slave done with the same radio resources and power allocation as prior transmissions. Information gathered may be used in future selection of optimized parameters.

In some embodiments, the wireless link might contain the information from the links of several other communicating entities, i.e., wireless backhaul.

Figure 3:
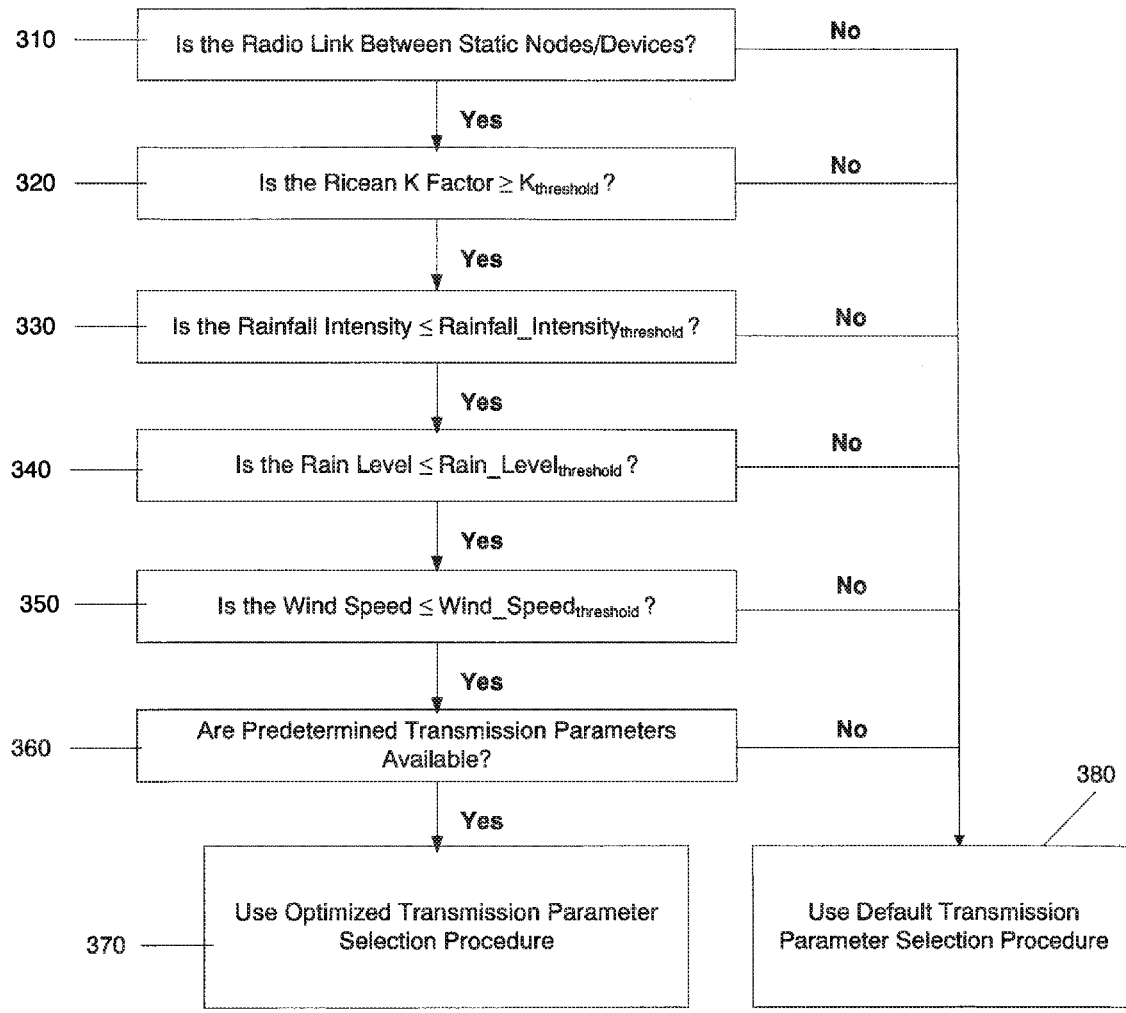
FIG. 3 is a flow chart illustrating a transmission parameter selection process in accordance with exemplary embodiments.

Referring now to FIG. 3, a process 300 for selecting a transmission parameter for use by a WCD is provided. The process 300 may be performed, for instance, by access node 104, WCD 106, and/or control node 108 to select transmission parameters for communications between WCD 106 and access node 104. For example, WCD 106 may be a static MTC device being served by access node 104, which may be a serving base station of network 102 or a relay node.

In step 310 a control unit, for instance, as part of an access node or control node, determines if the radio link between a wireless device and the network is static. For instance, the radio link between WCD 106 and access node 104 may be evaluated. If not, the process 300 moves to step 380, where default techniques are used to select transmission parameters. Otherwise, the process 300 moves to step 320. In some embodiments, the wireless device may be equipped with wind speed and/or rain measurement sensors.

In step 320, the control unit evaluates the Ricean K factor of the radio link. If the Ricean K factor is not greater than a threshold value, $K_{threshold}$, the process 300 moves to step 380. If the threshold is met or exceeded, the process 300 moves to step 330, where the control unit can begin to consider aspects of weather conditions that may affect the channel.

In step 330, the control unit evaluates a rainfall intensity, for instance, the rainfall intensity at an access node, a wireless device, or the space in between the nodes. The rainfall intensity may be, for example, the amount of rain in the last hour or other suitable time frame. The intensity may be given, for instance, in units of mm/hr. If the rainfall intensity is not less than or equal to a threshold rainfall intensity value, $Rainfall\_Intensity_{threshold}$, the process 300 moves to step 380. If the threshold is satisfied, i.e., the rainfall intensity is less than or equal to $Rainfall\_Intensity_{threshold}$, the process 300 moves to step 340.

In step 340, the control unit evaluates a rain level, for instance, the rain level at an access node, a wireless device, or the space in between the nodes. The rain level may be, for example, the amount of rain currently, or in the last T seconds or M minutes. If the rain level is not less than or equal to a threshold rain level value, $Rain\_Level_{threshold}$, the process 300 moves to step 380. If the threshold is satisfied, i.e., the rain level is less than or equal to $Rain\_Level_{threshold}$, the process 300 moves to step 350. According to some embodiments, the control unit may consider less recent rain fall, e.g., over the most recent few hours, as previous rainfall may still affect the wireless link. For example, leaves on nearby trees may still be wet from rain in the previous hours, which can affect multipath propagation. Similarly, if there has been a high average rainfall in the previous hours, requirements for the current rain level (e.g., $Rain\_Level_{threshold}$) may be relaxed. This relationship between current and recent conditions may be applied to other conditions, such as wind speed in the following step.

In step 350, the control unit evaluates a wind speed, for instance, the wind speed at an access node, a wireless device, or the space in between the nodes. If the wind speed is not less than or equal to a threshold wind speed value, Wind_Speed$_{threshold}$, the process 300 moves to step 380. If the threshold is satisfied, i.e., the wind speed is less than or equal to Wind_Speed$_{threshold}$, the process 300 moves to step 360.

In step 360, the control unit determines whether there are predetermined transmission parameters available. If not, the process 300 moves to step 380 for default parameter selection. If predetermined transmission parameters are available, the process 300 moves to step 370, where the control unit implements an optimized transmission parameter selection procedure. The procedure of step 370 may be based on, for instance, an optimum predetermined transmission parameter.

According to some embodiments, the threshold value in any of the foregoing steps may be set and/or altered based on the measurements in other steps. In other words, the threshold values may be dependent on other conditions. For instance, the rain and wind threshold may be set according to the Ricean K value, or the wind threshold may be set based on the rain measurements. In certain aspects, the higher the rain intensity of step 330, the lower the threshold may be set for steps 340 and 350. Similarly, the threshold in step 350 may be lowered if there is a high current rain level.

In some embodiments, the time windows used for the measurements of steps 330-350 may be dependent upon the amount of time it takes for leaves to dry.

Figure 4:
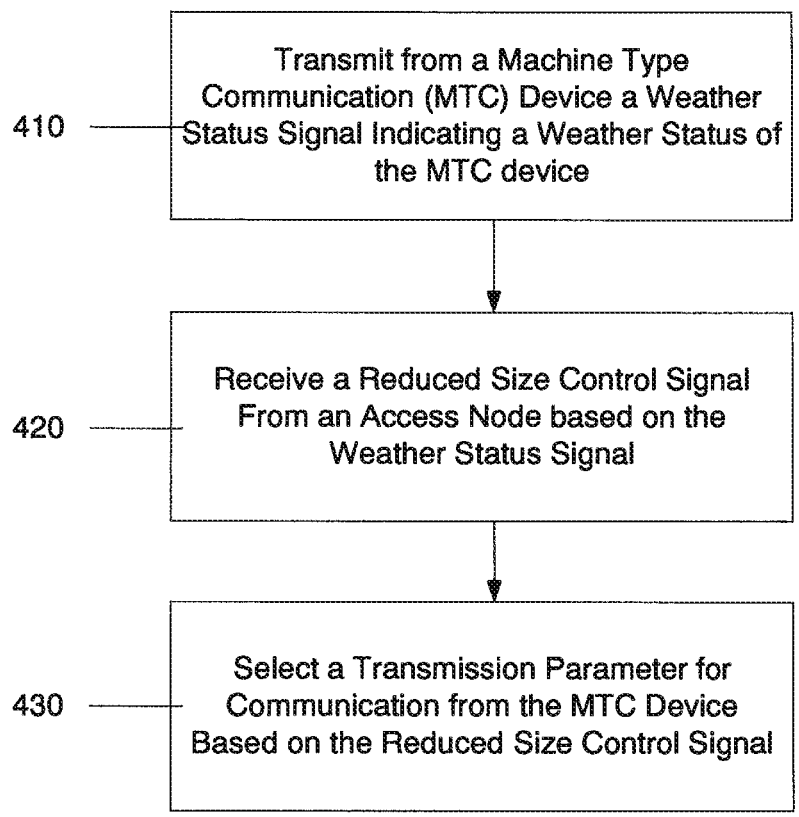
FIG. 4 is a flow chart illustrating a transmission selection process in accordance with exemplary embodiments.

Referring now to FIG. 4, a process 400 for selecting a transmission parameter for a Machine Type Communication (MTC) device in a wireless network is provided. The network may include, for example, a number of access nodes such as access node 104. In some embodiments, the process 400 is performed by a wireless device, such as device 106 in network 100.

In step 410, device 106 transmits a weather status signal relating to a weather condition of the device to access node 104.

In step 420, the device 106 receives a reduced size control signal from access node 104. The reduced size control signal is based at least in part on the weather status signal from device 106. In some embodiments, the reduced size control signal was determined by access node 104 or a control node, such as node 106, in accordance with one or more steps of processes 200 and 300 discussed above. The reduced size control signal may be, for instance, a 1-bit signal.

In step 430, the device 106 selects a transmission parameter for communications from the device to access node 104 based on the received control signal of step 420. The selected transmission parameter may be, for example, the previously used transmission parameter, a stored optimum transmission parameters, or a transmission parameter offset from a previously used parameter by a delta value D.

Figure 5:
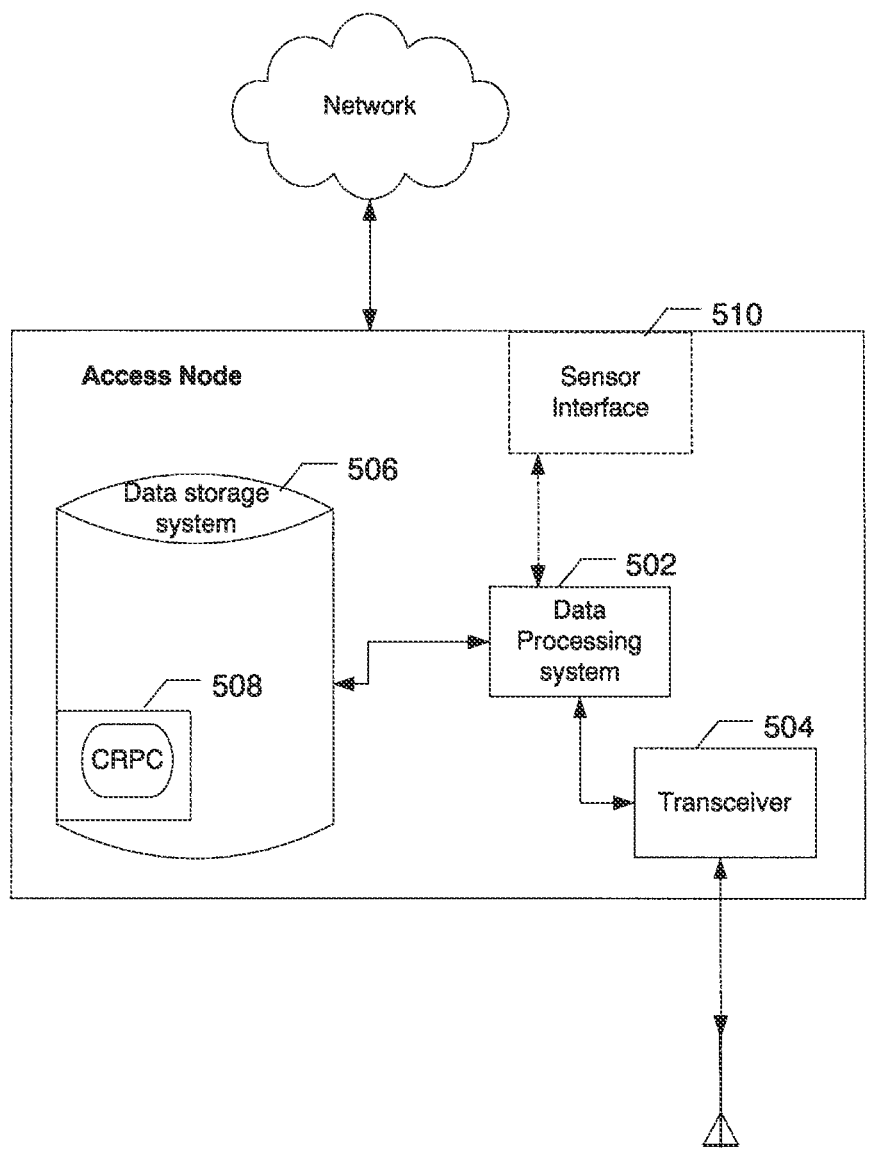
FIG. 5 is a block diagram of an access node in accordance with exemplary embodiments.

FIG. 5 illustrates a block diagram of an exemplary access node, such as node 104 shown in FIG. 1. As shown in FIG. 5, the access node 104 may include: a data processing system 502, which may include one or more microprocessors and/or one or more circuits, such as an application specific integrated circuit (ASIC), field-programmable gate arrays (FPGAs), and the like; a sensor interface 510 configured to measure and/or receive information from sensors, such as wind and rain sensors; a transceiver 504, and a data storage system 506, which may include one or more non-volatile storage devices and/or one or more volatile storage devices (e.g., random access memory (RAM)). According to some embodiments, the data processing system 502 may comprise a control unit used for selection of transmission parameters.

In embodiments where data processing system 502 includes a microprocessor, computer readable program code (CRPC) 508 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 502 to perform steps described above (e.g., steps described above with reference to the flow chart shown in FIGS. 2 and 3). In other embodiments, the access node 104 is configured to perform steps described herein without the need for code. That is, for example, data processing system 502 may consist merely of one or more ASICs. Hence, the features of the embodiments described herein may be implemented in hardware and/or software. For example, in particular embodiments, the functional components of the base station described above may be implemented by data processing system 502 executing computer instructions, by data processing system 502 operating independent of any computer instructions, or by any suitable combination of hardware and/or software.

Figure 6:
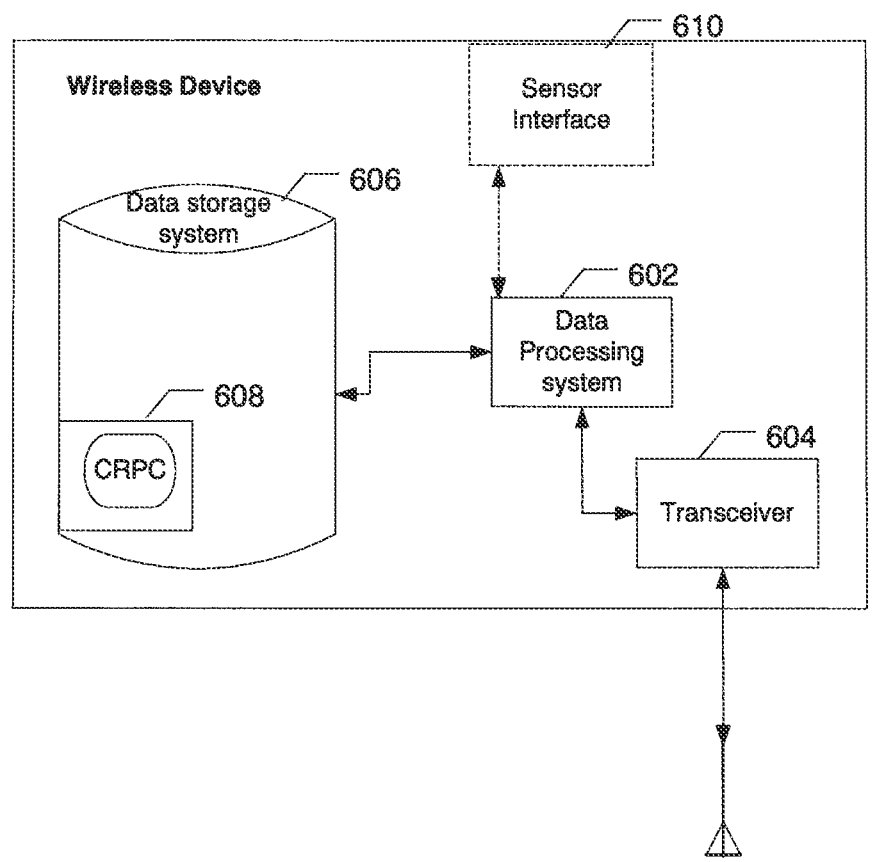
FIG. 6 is a block diagram of a machine type communication (MTC) device in accordance with exemplary embodiments.

FIG. 6 illustrates a block diagram of an exemplary wireless device, such as device 106 shown in FIG. 1. As shown in FIG. 6, the device 106 may include: a data processing system 602, which may include one or more microprocessors and/or one or more circuits, such as an application specific integrated circuit (ASIC), field-programmable gate arrays (FPGAs), and the like; a sensor interface 610 configured to measure and/or receive information from sensors, such as wind and rain sensors; a transceiver 604, and a data storage system 606, which may include one or more non-volatile storage devices and/or one or more volatile storage devices (e.g., random access memory (RAM)). According to some embodiments, the data processing system 602 may comprise a control unit used for selection of transmission parameters.

In embodiments where data processing system 602 includes a microprocessor, computer readable program code (CRPC) 608 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 602 to perform steps described above (e.g., steps described above with reference to the flow chart shown in FIGS. 2 and 3). In other embodiments, the device 106 is configured to perform steps described herein without the need for code. That is, for example, data processing system 602 may consist merely of one or more ASICs. Hence, the features of the embodiments described herein may be implemented in hardware and/or software. For example, in particular embodiments, the functional components of the base station described above may be implemented by data processing system 602 executing computer instructions, by data processing system 602 operating independent of any computer instructions, or by any suitable combination of hardware and/or software.

Figure 7:
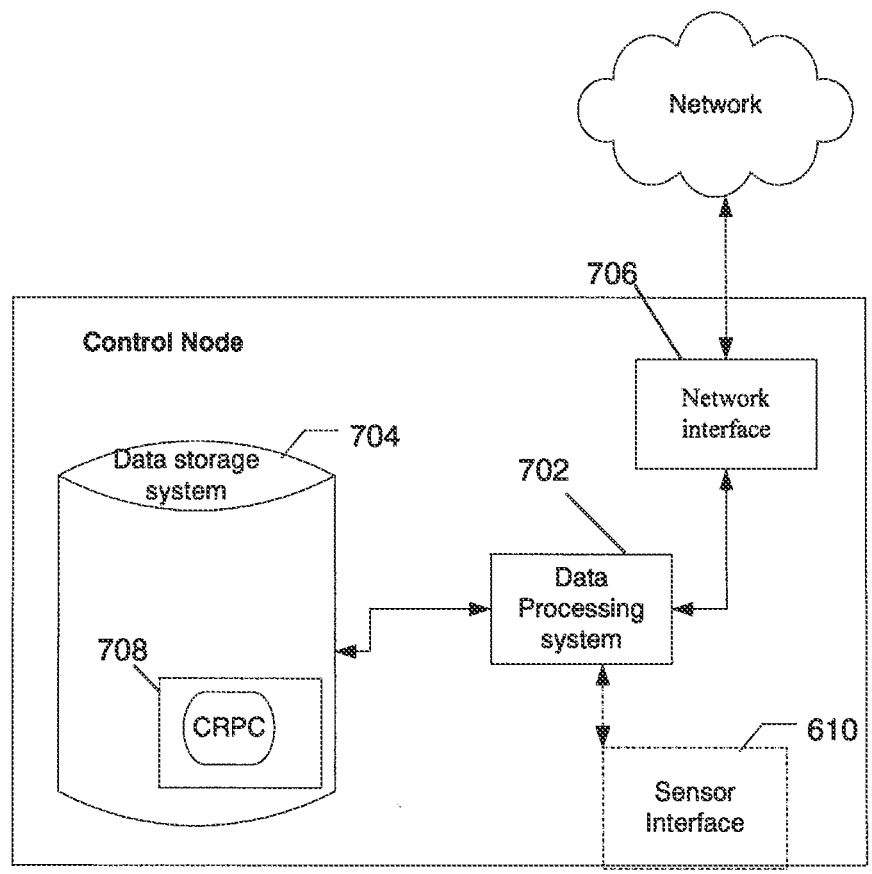
FIG. 7 is a block diagram of a control node in accordance with exemplary embodiments.

FIG. 7 illustrates a block diagram of an exemplary control node, such as node 108 shown in FIG. 1. As shown in FIG. 7, the control node 108 may include: a data processing system 702, which may include one or more microprocessors and/or one or more circuits, such as an application specific integrated circuit (ASIC), field-programmable gate arrays (FPGAs), and the like; a sensor interface 710 configured to measure and/or receive information from sensors, such as wind and rain sensors; a network interface 706, and a data storage system 704, which may include one or more non-volatile storage devices and/or one or more volatile storage devices (e.g., random access memory (RAM)). According to some embodiments, the data processing system 702 may comprise a control unit used for selection of transmission parameters.

In embodiments where data processing system 702 includes a microprocessor, computer readable program code (CRPC) 708 may be stored in a computer readable medium, such as, but not limited to magnetic media (e.g., a hard disk), optical media (e.g., a DVD), memory devices (e.g., random access memory), and the like. In some embodiments, computer readable program code is configured such that when executed by a processor, the code causes the data processing system 702 to perform steps described above (e.g., steps described above with reference to the flow chart shown in FIGS. 2 and 3). In other embodiments, the control node 104 is configured to perform steps described herein without the need for code. That is, for example, data processing system 702 may consist merely of one or more ASICs. Hence, the features of the embodiments described herein may be implemented in hardware and/or software. For example, in particular embodiments, the functional components of the base station described above may be implemented by data processing system 702 executing computer instructions, by data processing system 702 operating independent of any computer instructions, or by any suitable combination of hardware and/ or software.

An exemplary advantage provided by the particular implementations of the proposed solutions is the minimization of signaling overhead. Consider for example a given wireless link between static wireless devices and nodes. Wireless communication takes place at a given carrier frequency, C, and the used bandwidth is W. Consider that during a normal weather condition, i.e., without rain and wind, the wireless link exhibits a given Ricean factor K of a given (high) value. Assume that allocation for one direction of the link is done in all the available sub-bands of the system, $F_1, F_2, F_3, \ldots, F_N$. Assume also that for this designated link, there is frequency selectivity, which results in the sub-band $F_5$ being the one that results in the highest throughput. Then, for example, at the step 250 of process 200 or step 360/370 of process 300, the sub-band $F_5$ is selected. Such allocation can be done automatically, without considerable signaling. For example, if both communicating entities have sensors measuring rain level and wind speed, and conditions are acceptable, this sub-band is always allocated. In case of transmission of new packets, then, the transmitter simply notifies the receiver on the existing of a new transmission by simply sending a reduced signal, such as a bit.

Thus, particular implementations of the proposed solutions can reduce the amount of information that must be signaled to indicate transmission parameters such as power allocation and scheduling results. Additionally, particular implementations may reduce the amount of signaling needed for purposes of determining the current state of the wireless link. Although much of the disclosure is explained with respect to power and scheduling allocation, one of ordinary skill in the art will recognize that the disclose covers other transmission parameters. Similarly, although much of the disclosure is explained with respect to rain and wind conditions, one of ordinary skill in the art will recognize that the disclosed weather conditions may cover humidity, snow, hail, fog, and the like.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for selecting a transmission parameter for use by a first wireless communication device (WCD), comprising:
   a control unit obtaining a propagation value that is indicative of a radio link between the first WCD and a second WCD;
   the control unit obtaining a set of one or more weather values that is indicative of a weather state at or near the first WCD;
   the control unit determining whether said propagation value satisfies a predetermined propagation condition;
   the control unit determining whether said weather state satisfies a predetermined weather condition;
   the control unit performing a first transmission parameter selection procedure in response to determining at least that the propagation value satisfies the predetermined propagation condition and the weather state satisfies the predetermined weather condition; and
   the control unit performing a second transmission parameter selection procedure, which is different than the first transmission parameter selection procedure, when the propagation value does not satisfy the predetermined propagation condition or the weather state does not satisfy the predetermined weather condition.

2. The method of claim 1, wherein the control unit is a component of one of: said first WCD, said second WCD, and a Radio Network Controller.

3. The method of claim 1, wherein said propagation value is a Ricean K factor and said determining whether said propagation value satisfies a predetermined propagation condition comprises determining whether said propagation value is greater than a threshold Ricean K factor value.

4. The method of claim 1, wherein said weather state is one or more of a rainfall intensity, a rain level, and a wind speed.

5. The method of claim 1, further comprising determining if the first WCD is a static WCD, wherein:
   determining whether said propagation value satisfies a predetermined propagation condition comprises determining whether said propagation value satisfies a predetermined propagation condition in response to determining that the first WCD is a static WCD; and
   determining whether said weather state satisfies a predetermined weather condition comprises determining whether said weather state satisfies a predetermined weather condition in response to determining that the first WCD is a static WCD.

6. The method of claim 1, wherein
   the first transmission parameter selection procedure comprises sending to the first WCD a message, and
   the message is configured to cause the first WCD to select a default transmission parameter and to use the selected transmission parameter in transmitting data over the radio link.

7. The method of claim 6, wherein the default transmission parameter is a transmission parameter previously used by the first WCD.

8. The method of claim 6, wherein the message is a 1-bit message.

9. The method of claim 1, wherein
the method further comprises storing in a data store a transmission parameter, and
the first transmission parameter selection procedure comprises retrieving the transmission parameter from the data store and transmitting the retrieved transmission parameter to the first WCD.

10. The method of claim 1, wherein
the first transmission parameter selection procedure comprises inhibiting the sending of a particular control message to the first WCD, which causes the first WCD to select a previously used transmission parameter.

11. The method of claim 1, wherein the step of obtaining the propagation value comprises receiving the propagation value from a network access node.

12. The method of claim 1, wherein the method further comprises:
storing a set of two or more transmission parameter values, where each transmission parameter value included in the set is associated with a different radio link state, and
the first transmission parameter selection procedure comprises selecting a transmission parameter value from the set of transmission parameter values based on a determination of the state of the radio link.

13. The method of claim 1, wherein obtaining the set of weather values comprises receiving a weather status signal from the first WCD.

14. The method of claim 1, wherein
the set of one or more weather values comprises a weather value indicating a rainfall intensity and a weather value indicating a wind speed, and
determining whether said weather state satisfies the predetermined weather condition comprises:
determining whether the indicated rainfall intensity is less than a threshold rainfall intensity; and
determining whether the indicated wind speed is less than a threshold wind speed, wherein the value of the threshold wind speed depends on the indicated rainfall intensity.

15. The method of claim 1, wherein the propagation value is obtained independently of obtaining the set of one or more weather values.

16. The method of claim 1, wherein the propagation value is obtained based on a signal arriving at the second WCD by a plurality of paths, wherein a line-of-sight path is one of the plurality of paths and is much stronger than other paths.

17. The method of claim 1, wherein the propagation value is a measure of a relative strength of a direct component of a received signal with respect to scattered components of the received signal.

18. A method for selecting a transmission parameter for a wireless communication device (WCD) in a wireless network having one or more access nodes, comprising:
transmitting, from said WCD, a weather status signal that indicates a weather status of said WCD;
receiving, at said WCD, a control signal from one of said access nodes, wherein said control signal is based at least in part on said weather status signal; and
selecting, at said WCD, a transmission parameter for communication from said WCD based on said control signal.

19. The method of claim 18, wherein said control signal is a 1-bit control signal.

20. The method of claim 18, wherein said selecting the transmission parameter includes selecting a transmission parameter for an immediately preceding transmission.

21. The method of claim 18, further comprising:
storing, in a memory of the WCD, an optimized transmission parameter,
wherein said selecting the transmission parameter includes selecting said optimized transmission parameter.

22. The method of claim 18, wherein said transmission parameter is one of a channel allocation parameter, a power allocation parameter, a link adaptation parameter, a multiple input multiple output (MIMO) configuration parameter, and a redundancy setting parameter.

23. The method of claim 18, wherein said transmission parameter is one of a channel allocation parameter, a power allocation parameter, a link adaptation parameter, a multiple input multiple output (MIMO) configuration parameter, and a redundancy setting parameter.

24. The method of claim 18, wherein the WCD is a Machine Type Communications (MTC) device.

25. A control unit for selecting a transmission parameter for use by a first wireless communication device (WCD), the control unit being configured to:
obtain a propagation value that is indicative of a radio link between the first WCD and a second WCD;
obtain a set of one or more weather values that is indicative of a weather state at or near the first WCD;
determine whether said propagation value satisfies a predetermined propagation condition;
determine whether said weather state satisfies a predetermined weather condition; and
perform a first transmission parameter selection procedure in response to determining at least that the propagation value satisfies the predetermined propagation condition and the weather state satisfies the predetermined weather condition, wherein
the control unit is configured to perform a second transmission parameter selection procedure, which is different than the first transmission parameter selection procedure, when the propagation value does not satisfy the predetermined propagation condition or the weather state does not satisfy the predetermined weather condition.

26. The control unit of claim 25, wherein the control unit is a component of one of: said first WCD, said second WCD, and a Radio Network Controller.

27. The control unit of claim 25, wherein said propagation value is a Ricean K factor.

28. The control unit of claim 27, wherein the control unit is configured to determine whether said propagation value satisfies a predetermined propagation condition by determining whether said propagation value is greater than a threshold Ricean K factor value.

29. The control unit of claim 25, wherein the control unit is further configured to determine whether the first WCD is a static WCD.

30. The control unit of claim 25, wherein
the first transmission parameter selection procedure comprises inhibiting the sending of a particular control message to the first WCD, which causes the first WCD to select a previously used transmission parameter.

31. The control unit of claim 25, wherein
the set of one or more weather values comprises a weather value indicating a rainfall intensity and a weather value indicating a wind speed, and
the control unit is configured to determine whether said weather state satisfies the predetermined weather condition by:
determining whether the indicated rainfall intensity is less than a threshold rainfall intensity; and determining whether the indicated wind speed is less than a threshold wind speed, wherein the value of the threshold wind speed depends on the indicated rainfall intensity.

* * * * *